(12) United States Patent
Zou et al.

(10) Patent No.: US 11,416,255 B2
(45) Date of Patent: Aug. 16, 2022

(54) INSTRUCTION EXECUTION METHOD AND INSTRUCTION EXECUTION DEVICE

(71) Applicant: Shanghai Zhaoxin Semiconductor Co., Ltd., Shanghai (CN)

(72) Inventors: Penghao Zou, Beijing (CN); Chen-Chen Song, Beijing (CN); Kang-Kang Zhang, Beijing (CN); Jianbin Wang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 16/813,947

(22) Filed: Mar. 10, 2020

(65) Prior Publication Data
US 2020/0401410 A1 Dec. 24, 2020

(30) Foreign Application Priority Data
Jun. 19, 2019 (CN) .......................... 201910530579.5

(51) Int. Cl.
*G06F 9/38* (2018.01)
*G06F 9/30* (2018.01)
*G06F 9/22* (2006.01)

(52) U.S. Cl.
CPC ............ *G06F 9/3836* (2013.01); *G06F 9/223* (2013.01); *G06F 9/3013* (2013.01)

(58) Field of Classification Search
CPC .................................................. G06F 9/3836
See application file for complete search history.

(56) References Cited

U.S. PATENT DOCUMENTS

| | | | | | |
|---|---|---|---|---|---|
| 5,974,524 | A | * | 10/1999 | Cheong | G06F 9/3863 712/23 |
| 6,609,191 | B1 | * | 8/2003 | Hooker | G06F 9/3017 712/216 |
| 6,708,267 | B1 | * | 3/2004 | Flacks | G06F 9/3838 712/216 |
| 2004/0059898 | A1 | * | 3/2004 | Baxter | G06F 9/3836 712/235 |

(Continued)

*Primary Examiner* — Michael J Metzger
(74) *Attorney, Agent, or Firm* — McClure, Qualey & Rodack, LLP

(57) ABSTRACT

An instruction execution method suitable for being executed by a processor is provided. The first processor comprises a register alias table (RAT) and a reservation station. The instruction execution method includes: a register alias table receives a first micro-instruction and a second micro-instruction and issues the first micro-instruction and the second micro-instruction to the reservation station; and the reservation station assigns one of a plurality of execution units to execute the first micro-instruction, according to the first specific message of the first micro-instruction; and the reservation station assigns one of the execution units to execute the second micro-instruction, according to the second specific message of the second micro-instruction. When the reservation station determines that the execution units assigned for the first micro-instruction and the second micro-instruction are the same, the reservation station indicates that the second micro-instruction depends on the first micro-instruction.

19 Claims, 5 Drawing Sheets

(56) References Cited

U.S. PATENT DOCUMENTS

| | | | |
|---|---|---|---|
| 2009/0106533 A1* | 4/2009 | Arakawa | G06F 9/3834 712/205 |
| 2009/0328057 A1* | 12/2009 | Lahav | G06F 9/3017 718/106 |
| 2013/0046954 A1* | 2/2013 | Ruehle | H04L 47/2483 712/1 |
| 2014/0181476 A1* | 6/2014 | Srinivasan | G06F 9/3838 712/208 |

* cited by examiner

INSTRUCTION EXECUTION METHOD AND INSTRUCTION EXECUTION DEVICE

CROSS-REFERENCE TO RELATED APPLICATION

This application claims priority of China Application Serial Number 201910530579.5, filed on Jun. 19, 2019, the entirety of which is herein incorporated by reference.

BACKGROUND

Technical Field

The present invention relates to an instruction execution mechanism and in particular to an instruction execution method and an instruction execution device.

Description of the Related Art

In general, while the execution unit of the processor is processing the instruction, and if the latter instruction in the code requires data from the former instruction (that is, the source operand of the latter instruction is the same as the destination operand of the former instruction), this means that there is a data dependency between the former instruction and the latter instruction. In addition, when the former instruction and the latter instruction are dispatched to the same execution unit for execution, since the two instructions use the same hardware resource, this means that there is a structural dependency between the former instruction and the latter instruction.

When there is a structural dependency between instructions, although there is a sequence between the two instructions in the code, the execution unit may execute the latter instruction in the code first, and then execute the former instruction since the execution unit of the processor executes instructions out-of-order. The traditional method is to use the reorder buffer (ROB) to reorder the execution results of each instruction and then ensure that the instructions are retired in order.

However, since this method needs to reorder the execution results of each instruction, and then ensure that the instructions are sequentially retired, it takes a long time and may cause a delay for the execution unit to execute multiple instructions which require a long operation time (such as floating point operation instructions) when there is structural dependency between these instructions.

Therefore, how to effectively extend the processing performance of the processor based on the architecture of the current processor, and reduce the delay time required for the execution unit to execute the instructions when there is a structural dependency between the instructions has become a problem to be solved in the field.

BRIEF SUMMARY

An embodiment of the invention introduces an instruction execution method. The instruction execution method is suitable for being executed by a processor. The first processor comprises a register alias table (RAT) and a reservation station. The instruction execution method includes: a register alias table receives a first micro-instruction and a second micro-instruction and issues the first micro-instruction and the second micro-instruction to the reservation station; the reservation station assigns one of a plurality of execution units to execute the first micro-instruction according to a first specific message of the first micro-instruction; and the reservation station assigns another execution unit to execute the second micro-instruction, according to a second specific message of the second micro-instruction. When the reservation station determines that the execution units assigned for the first micro-instruction and the second micro-instruction are the same, the reservation station indicates that the second micro-instruction depends on the first micro-instruction.

An embodiment of the invention introduces an instruction execution device. The instruction execution device includes a reservation station and a register alias table. The register alias table is configured to receive a first micro-instruction and a second micro-instruction, and to issue the first micro-instruction and the second micro-instruction to the reservation station. The reservation station assigns an execution unit to execute the first micro-instruction according to the first specific message of the first micro-instruction, and it assigns another execution unit to execute the second micro-instruction according to the second specific message of the second micro-instruction. When the reservation station determines that the execution unit assigned for the first micro-instruction and the second micro-instruction are the same, the reservation station indicates that the second micro-instruction depends on the first micro-instruction.

The instruction execution method and the instruction execution device of the present invention can indicate a structural dependency with the proceeding micro-instruction for the succeeding micro-instruction by the reservation station, so that the succeeding micro-instruction can wait for the completion of the execution of the proceeding micro-instruction. After the execution of the proceeding micro-instruction is complete, the succeeding micro-instruction is dispatched by the reservation station for execution. In the occasion to execute multiple micro-instructions with structural dependency and instruction types needing a long operation time, delays caused by the succeeding micro-instruction that is executed before the proceeding micro-instruction but that can only be retired after waiting for the proceeding micro-instruction and other proceeding instructions have retired in order are avoided. The instruction execution method and the instruction execution device of the present invention greatly reduce the overall execution time.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
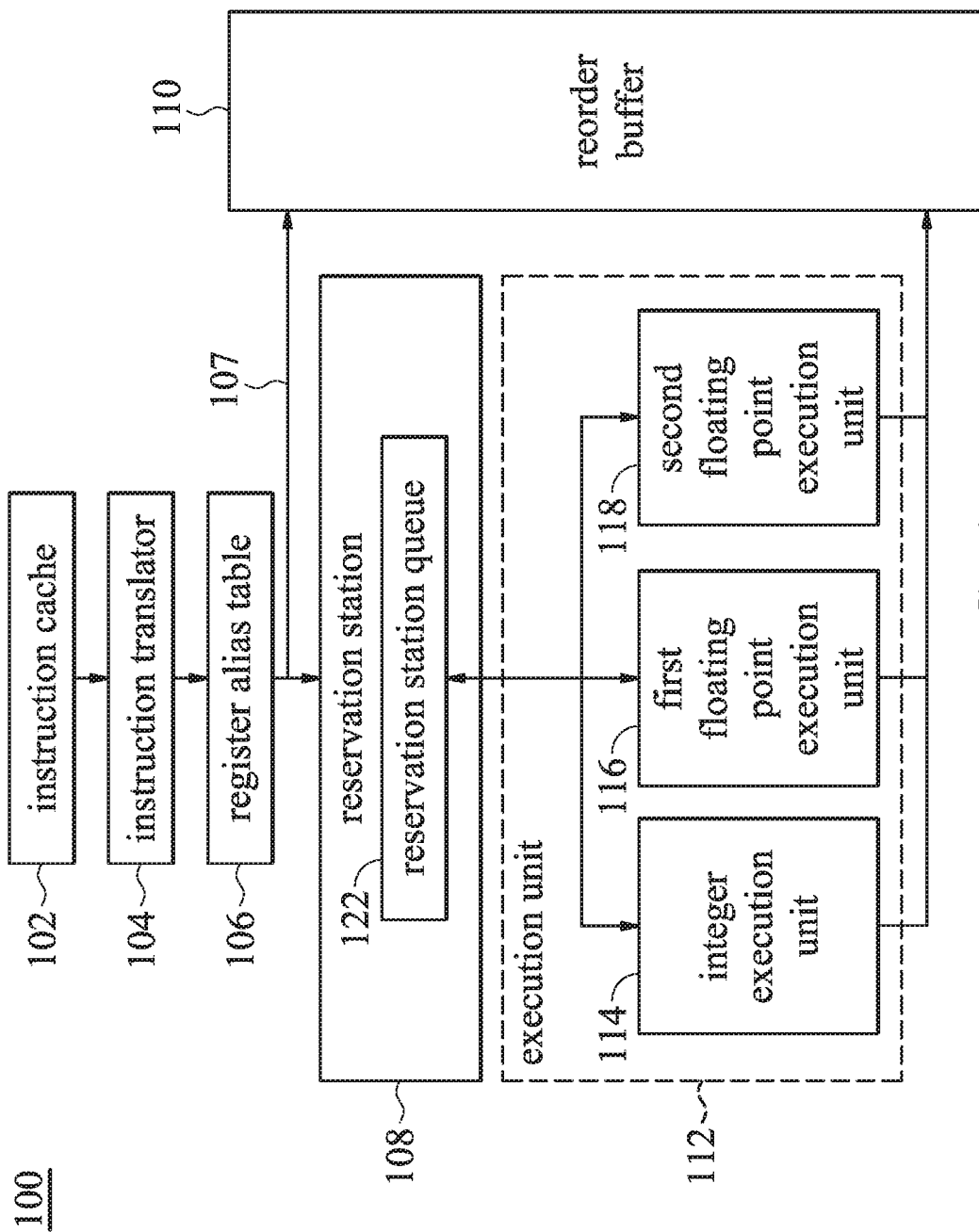
FIG. 1 is a block diagram illustrating an instruction execution device according to an embodiment of the invention.

In one embodiment, please refer to FIG. 1, which is a block diagram illustrating an instruction execution device 100 according to an embodiment of the invention. In one embodiment, the instruction execution device 100 includes a register alias table (RAT) 106, a reservation station 108 and an execution unit 112. In one embodiment, the execution unit 112 may include one or more floating point execution units, such as first floating point execution unit 116 and second floating point execution unit 118, and the like. The register alias table 106 receives at least one micro-instruction (or μop). For example, a first micro-instruction and a second micro-instruction are received. The register alias table 106 issues the first micro-instruction and the second micro-instruction to the reservation station 108. The reservation station 108 is configured to assign the execution unit (i.e., one of the execution units 114-118 shown in FIG. 1) to execute the first micro-instruction according to a first specific message of the first micro-instruction and assign an execution unit (i.e., one of the execution units 114-118 shown in FIG. 1) to execute the second micro-instruction according to a second specific message of the second micro-instruction.

In one embodiment, the instruction execution device 100 can be implemented by, for example, a microcontroller, a microprocessor, a digital signal processor, an application specific integrated circuit (ASIC), or a logic circuit.

In one embodiment, as shown in FIG. 1, the instruction execution device 100 (e.g., implemented by a microprocessor) includes an instruction cache 102 for storing macro instructions of instructions set architecture, such as an x86 instruction set architecture. In addition, the instruction translator 104 receives the macro instructions and translates them into micro-instructions (or μops). The micro-instruction is then provided to a register alias table (RAT) 106, which is used to implement the rename (rename). In one embodiment, the rename operation renames each source operand and destination operand of the micro-instruction to an index of the corresponding physical register file (PRF). In another embodiment, the rename operation renames the source operand and the destination operand of the micro-instruction to an index in the corresponding reorder buffer (ROB) 110. The renamed micro-instructions are issued to the reservation station 108.

In one embodiment, the register alias table 106 issued the renamed micro-instruction to the reorder buffer (ROB) 110 via the instruction path 107. The reorder buffer 110 stores each entry for each micro-instruction transmitted from the register alias table 106 in accordance with the original order of the micro-instructions in the program. These entries are also called reorder buffer entries, and ordered by a reordering buffer index (ROB index).

In one embodiment, the reservation station 108 indicates the dependency of the micro-instruction, and the dependency refers to which micro-instruction's destination operand the source operand of a micro-instruction depends on or relates to. For example, the source operand of a subsequent arithmetic logic unit (ALU) instruction may depend on or be related to the destination operand of the proceeding load instruction.

In one embodiment, the reservation station 108 dispatches instructions to the appropriate one of the plurality of execution units 112 for execution.

In one embodiment, the reservation station 108 includes at least one reservation station queue 122 (RS queue). The reservation station queue is also called a reservation-station matrix (RS matrix). When the instruction is ready to be executed (all source operands of the instruction are ready and all dependencies are resolved), the reservation station queue 122 schedules and dispatches the corresponding instruction to the corresponding execution unit 112. The execution unit 112 provides their execution results to the reorder buffer 110, which ensures that the instructions are retired in order.

In one embodiment, the reservation station queue 122 corresponds to an integer execution unit 114, a first floating point execution unit (FPU) 116, and a second floating point execution unit 118.

In one embodiment, all types of execution units 114-118 share a common reservation queue. In another embodiment, multiple execution units of the same type share a reservation station queue. For example, the first floating point execution unit 116 shares a reservation station queue 122 with the second floating point execution unit 118. The invention is not limited thereto. In addition, the execution unit 112 includes more other types of execution units. For example, a memory order buffer (MOB) for executing a load/store instruction. The memory order buffer is not shown in FIG. 1.

It is should be noticed that the register alias table 106 is the last stage in which micro-instructions are executed sequentially (i.e., the instructions are executed according to the program order). Both the subsequent reservation station 108 and the execution unit 112 are operated out-of-order: the micro-instructions in the reservation station 108 whose operands are all ready are first dispatched to the execution unit 112 for execution (while there are multiple ready micro-instructions, then the oldest one in the reservation station 108 is selected). Therefore, at these stages, the original order of the micro-instructions in the program is broken, and the reorder buffer 110 ensures that the micro-instructions are sequentially retired in the program order after execution.

In one embodiment, when the first micro-instruction (e.g., the micro-instruction whose position is preceding in the code) and the second micro-instruction (e.g., the micro-instruction whose position is succeeding in the code) in the code use the same execution unit (for example, the first floating point execution unit 116), since the two instructions use the same hardware resource, there is a structural dependency between the first micro-instruction and the second micro-instruction. Since the execution units 112 of the processor are all out-of-order execution, the first floating point execution unit 116 may firstly execute the second micro-instruction in the code and then execute the first micro-instruction due to out-of-order execution. It may cause that the first floating point execution unit 116 generate a delay when executing a plurality of floating point operation instructions that require a long operation time.

Figure 2:
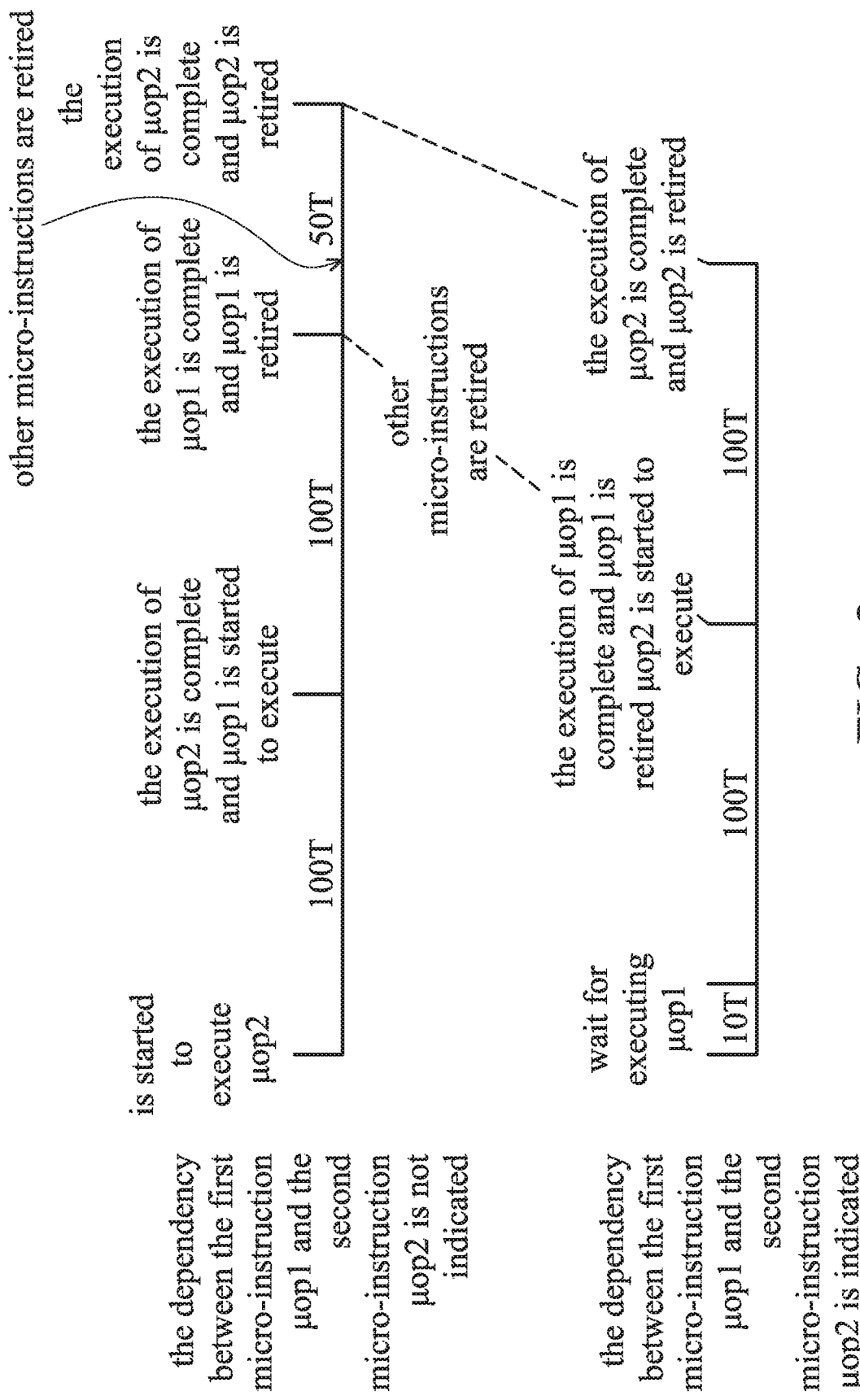
FIG. 2 is a schematic diagram illustrating an instruction execution method according to an embodiment of the invention.

For example, please refer to FIG. 2, which is a schematic diagram illustrating an instruction execution method according to an embodiment of the invention. In the example of FIG. 2, it is assumed that there is a structural dependency between the first micro-instruction μop1 and the second micro-instruction μop2. In the source code, the first micro-instruction μop1 corresponds to a preceding macro-instruction, and the second micro-instruction μop1 corresponds to a succeeding macro-instruction. Some other instructions (or micro-instructions) may be included between the first micro-instruction μop1 and the second micro-instruction μop2, since the execution unit 112 belongs to out-of-order execution. Therefore, in the execution unit 112, it is possible to execute the first micro-instruction μop1 firstly or the second micro-instruction μop2 firstly. In FIG. 2, the upper line represents the time unit T required to execute the first micro-instruction μop1 and the second micro-instruction μop2 when no dependency is indicated between μop1 and μop2. The lower line represents the time unit T required to execute the first micro-instruction μop1 and the second micro-instruction μop2 when the dependency is indicated between μop1 and μop2.

As can be seen from the upper line in the FIG. 2, in the case where the dependency between the first micro-instruction μop1 and the second micro-instruction μop2 is not indicated. The first floating point execution unit 116 spends 100T time units to execute the second micro-instructions μop2 firstly. After executing the second micro-instructions μop2, the first floating point execution unit 116 starts to execute the first micro-instruction μop1. The first floating point execution unit 116 spend 100T time units to execute the first micro-instruction μop1. After retiring the first micro-instruction μop1, it takes another 50T time units to completely execute and retire other micro-instructions (assuming that the first micro-instruction μop1 and the second micro-instruction μop2 are executed by the first floating point execution unit 116, and other micro-instructions are executed by other execution units, such as integer execution unit 114). Finally, it is the time for the second micro-instruction μop2 to retire in accordance with the original order of the micro-instructions in the reorder buffer 110. It can be seen that, in the case where the dependency between the first micro-instruction μop1 and the second micro-instruction μop2 is not indicated, it totally takes 250T time units for the execution unit 112 to complete the execution of the first micro-instruction μop1 and the second micro-instruction μop2.

As can be seen from the lower line in the FIG. 2, in the case of indicating the dependency between the first micro-instruction μop1 and the second micro-instruction μop2, initially the first floating point execution unit 116 may take 10T time units to wait for the first micro-instruction μop1 (e.g., the first micro-instruction op is in waiting to receive data) to start execution. Next, the first floating point execution unit 116 takes 100T time units to execute the first micro-instruction μop1 and then retires the first micro-instruction μop1. Then, the first floating point execution unit 116 takes 100T time units again to complete the execution of the second micro-instruction μop2 and other micro-instructions (assuming that the first micro-instruction μop1 and the second micro-instruction μop2 are executed by the first floating point execution unit 116. Moreover, other micro-instructions are executed by other execution unit executes, as the integer execution unit 114) and retires the micro-instructions. It can be seen that, in the case of indicating the dependency between the first micro-instruction μop1 and the second micro-instruction μop2, it totally takes 220T time units for the execution unit 112 to complete the execution of the first micro-instruction μop1 and the second micro-instruction μop2.

Therefore, if the first micro-instruction μop1 and the second micro-instruction μop2 are assigned to be executed by the same execution unit (for example, the first floating point execution unit 116), the reservation station 108 can mark or indicate the first micro-instruction μop1 and the second micro-instruction μop2 having structural dependency and perform scheduling. The delay time required for the first floating point execution unit 116 to execute such instructions may be reduced.

Figure 3:
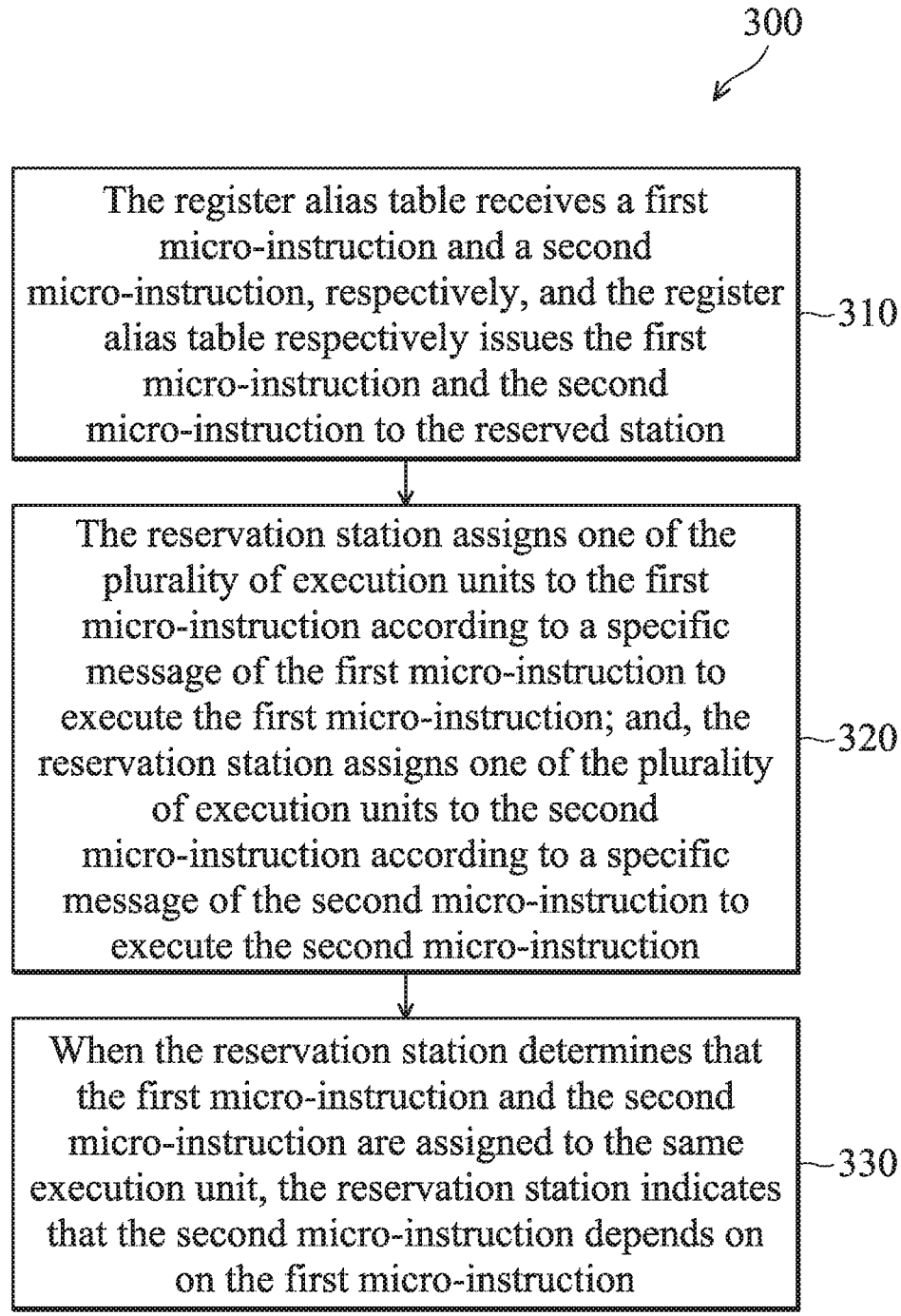
FIG. 3 is a flow chart illustrating an instruction execution method according to an embodiment of the invention.
Figure 4:
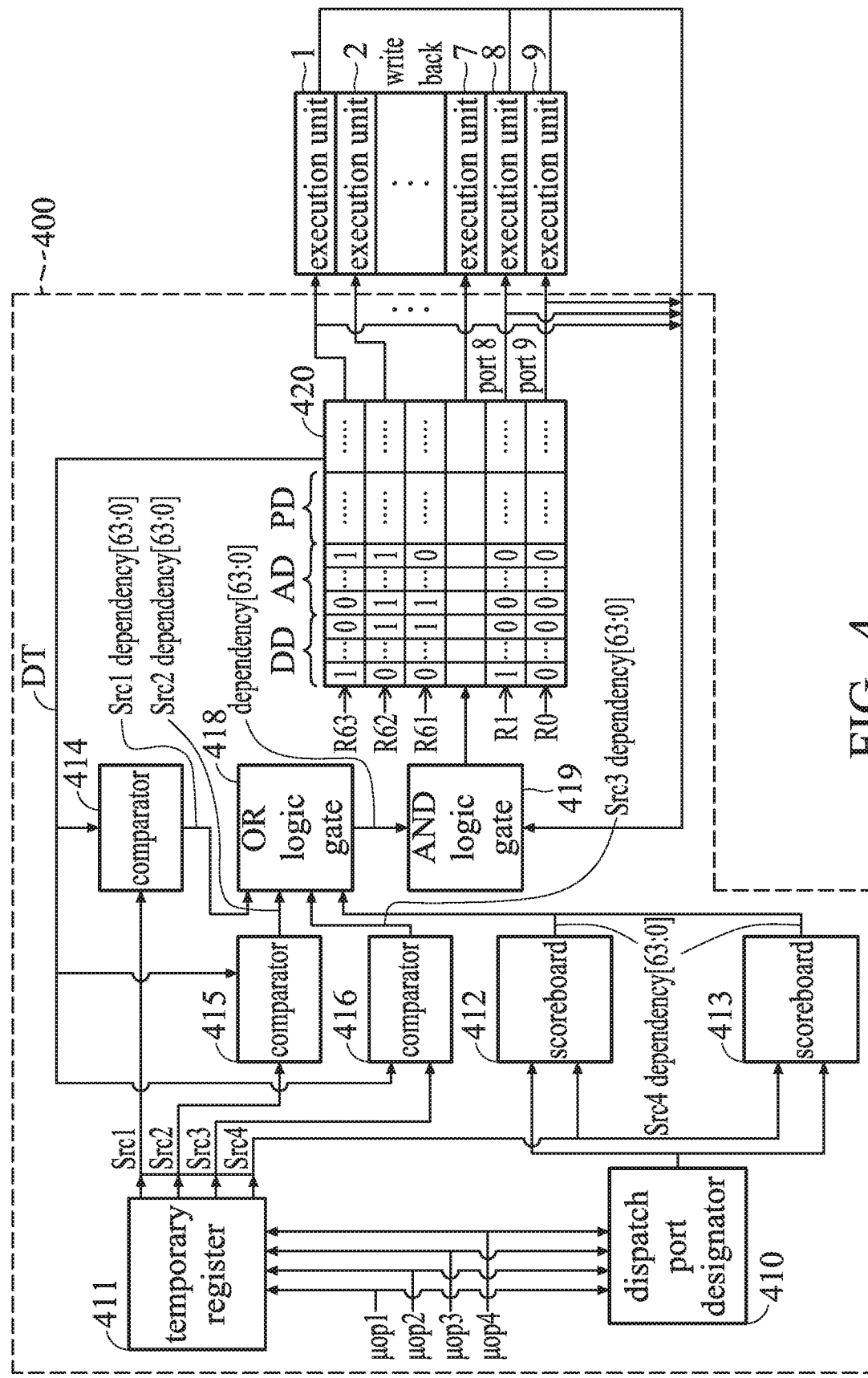
FIG. 4 is a block diagram illustrating a reservation station according to an embodiment of the invention.

Refer to FIG. 3 to FIG. 4, FIG. 3 is a flow chart illustrating an instruction execution method 300 according to an embodiment of the invention. FIG. 4 is a block diagram illustrating a reservation station 400 according to an embodiment of the invention. In FIG. 4, assume that each micro-instruction needs to be processed with only one execution unit. For convenience of description, among execution units 1 to 9, execution units 1 to 7 can be execution units which don not process floating point operations, such as integer execution units and memory order buffer (MOB), for example. Execution units 8 and 9 can be floating point execution units, for example. In other words, in this example, there are two execution units 8 and 9 that can process floating point operations. For example, execution units 8 and 9 may respectively correspond to the first floating point execution unit 116 and the second floating point execution unit 118 in FIG. 1, which is described below by way of example.

In step 310, the register alias table 106 receives a first micro-instruction μop1 and a second micro-instruction μop2, respectively, and the register alias table 106 respectively issues the first micro-instruction μop1 and the second micro-instruction μop2 to the reservation station 108 (i.e., the reservation station 400 of FIG. 4).

In one embodiment, as shown in FIG. 4, the register alias table 106 can transmit the first micro-instruction μop1, the second micro-instruction μop2, the third micro-instruction μop3, and the fourth micro-instruction μop4 to the reservation station 400.

In step 320, the reservation station 400 assigns one of the plurality of execution units 1 to 9 (for example, the floating point execution unit 8) to the first micro-instruction μop1 according to a specific message of the first micro-instruction op to execute the first micro-instruction. Moreover, the reservation station 400 assigns one of the plurality of execution units 1 to 9 (for example, floating point execution unit 8) to the second micro-instruction μop2 according to a specific message of the second micro-instruction μop2 to execute the second micro-instruction.

In one embodiment, the specific message can be an instruction type. For example, the first micro-instruction μop1, the second micro-instruction μop2, and the third micro-instruction μop3 are all of the instruction types of floating point operations. The fourth micro-instruction μop4 is of the instruction type of integer operation.

In the example of FIG. 4, when the first micro-instruction μop1, the second micro-instruction μop2, the third micro-instruction μop3, and the fourth micro-instruction μop4 enter the reservation station 400, these micro-instructions firstly are stored in the temporary register 411. In addition, the dispatch port designator 410 determines the instruction types of the first micro-instruction μop1, the second micro-instruction μop2, the third micro-instruction μop3, and the fourth micro-instruction μop4.

In one embodiment, if a certain micro-instruction can be executed by multiple execution units (for example, the micro-instruction can be executed both by the execution units 8 and 9 if the execution units 8 and 9 are both the floating point execution units) according to the foregoing specific message, the dispatch port designator 410 can assign an execution unit to execute the micro-instruction in a round robin manner, for example, multiple micro-instructions of the same type are assigned to the execution units 8 and 9 in a polling manner.

In step 330, when the reservation station 400 determines that the first micro-instruction μop1 and the second micro-instruction μop2 are assigned to the same execution unit (for example, both first micro-instruction μop1 and second micro-instruction μop2 are assigned to the floating point execution units 8), the reservation station 400 indicates that the second micro-instruction μop2 depends on the first micro-instruction μop1.

In one embodiment, the reservation station 400 includes a plurality of dispatch ports 1 to 9 for dispatching micro-instructions to execution units 1 to 9, respectively. The reservation station 400 determines whether the execution unit (for example, the floating-point execution unit 8) assigned by the reservation station 400 for the first micro-instruction μop1 and the second micro-instruction μop2 are the same according to whether a dispatch port (for example, the dispatch port 8) corresponding to the execution unit assigned by the reservation station 400 for the second micro-instruction μop2 includes a message corresponding to the first micro-instruction μop1.

More specifically, in one embodiment, the dispatch ports 1 to 9 each includes a scoreboard. Only the scoreboard 412 and the scoreboard 413 are shown in FIG. 4. The scoreboard 412 and the scoreboard 413 correspond to dispatch ports port 8 and port 9, respectively: That is, they correspond to the respective execution units 8 and 9. The scoreboard 412 and the scoreboard 413 respectively record the last micro-instructions of a particular type (e.g., floating point operation type) received from register alias table 106. The dispatch port designator 410 determines the instruction types of the first micro-instruction μop1, the second micro-instruction μop2, the third micro-instruction μop3, and the fourth micro-instruction μop4, respectively. The dispatch port designator 410 compares the first micro-instruction μop1, the second micro-instruction μop2, and the third micro-instruction μop3 belonging to the floating point operation type to the content of the scoreboard 412 or the scoreboard 413 corresponding to the assigned dispatch port thereof, respectively.

More specifically, if the first micro-instruction op is assigned to be dispatched by the dispatch port 8 to the execution unit 8, the reservation station 400 records the message corresponding to the first micro-instruction op on the scoreboard 412 corresponding to the dispatch port 8. If the third micro-instruction μop3 is also assigned to be dispatched by the dispatch port 8 to the execution unit 8, the reservation station 400 also records the message corresponding to the third micro-instruction μop3 on the scoreboard 412. When the reservation station 400 sends the related message of the third micro-instruction μop3 to the scoreboard 412, and if the message corresponding to the first micro-instruction μop1 has been recorded on the scoreboard 412, the third micro-instruction μop3 is marked as depending on the first micro-instruction μop1. This means that the third micro-instruction μop3 will use the same resource (i.e., the execution unit 8) as the first micro-instruction μop1 for execution. Therefore, the reservation station 400 reserves the third micro-instruction μop3 according to the dependency indicator to wait until execution of the first micro-instruction op is completed. How to mark the dependency and cancel the dependency indicator will be detailed later in FIG. 4. Of course, if the third micro-instruction μop3 is assigned to be dispatched by the dispatch port 9 to the execution unit 9, the reservation station 400 records the message corresponding to the third micro-instruction μop3 on the scoreboard 413 corresponding to the dispatch port 9.

For example, the first micro-instruction μop1, the second micro-instruction μop2, and the third micro-instruction μop3 are all of the same instruction type (floating point operation micro-instruction). The reservation station 400 assigns the first and second floating point execution units 8 and 9 for the first micro-instruction μop1, the second micro-instruction μop2, and the third micro-instruction μop3 in a round robin manner. When the reservation station 400 assigns the first micro-instruction μop1 and the third micro-instruction μop3 to be executed by the first floating point execution unit 8, and assigns the second micro-instruction μop2 to be executed by the second floating point execution unit 9, the scoreboard 412 of the dispatch port 8 records a message corresponding to the first micro-instruction μop1 and the third micro-instruction μop3 in order to indicate that both the first micro-instruction μop1 and the third micro-instruction μop3 are executed by the floating point execution unit 8. Then, the reservation station 400 marks the succeeding third micro-instruction μop3 depends on the preceding first micro-instruction μop1. The scoreboard 413 of the dispatch port 9 records the message corresponding to the second micro-instruction μop2. The reservation station 400 does not need to mark the dependency for the second micro-instruction μop2.

In another embodiment, when the dispatch port designator 410 assigns the first micro-instruction op to be dispatched by the dispatch port 8 to the execution unit 8 for execution, the reservation station 400 records the message of the first micro-instruction μop1 on the scoreboard 412 of the dispatch port 8. When the reservation station 400 assigns the second micro-instruction μop2 to be dispatched by the dispatch port 8 to the execution unit 8 for execution, the reservation station 400 queries whether the scoreboard 412 contains messages corresponding to other micro-instructions. In this example, the reservation station 400 can find the message corresponding to the first micro-instruction op on the scoreboard 412. When determining that the scoreboard 412 contains a message corresponding to the first micro-instruction μop1, the reservation station 400 marks or indicates that the second micro-instruction μop2 structurally depends on the first micro-instruction μop1. In this example, when the reservation station 400 assigns the third micro-instruction μop3 to be dispatched by the dispatch port 9 to the execution unit 9 for execution, the reservation station 400 queries whether the scoreboard 413 of the dispatch port 9 contains messages corresponding to other micro-instructions. When the reservation station 400 determines that there are no messages corresponding to other micro-instructions on the scoreboard 413, it is not necessary to indicate any structural dependency for the third micro-instruction μop3.

In other words, when the reservation station 400 assigns multiple micro-instructions to be executed by the same execution unit, these micro-instructions are considered as having a dependency.

In one embodiment, since the instruction type of the fourth micro-instruction μop4 is non-floating point operation (for example, an integer operation), the dispatch port designator 410 assigns the fourth micro-instruction μop4 to be stored in the temporary register 411. Moreover, the dispatch port designator 410 assigns the fourth micro-instruction μop4 to be dispatched by the dispatch port 2 to the integer execution unit (e.g., the execution unit 2) for execution.

The steps and/or methods of performing the various elements in FIG. 4 are described in more detail below. In one embodiment, after the first micro-instruction μop1, the second micro-instruction μop2, the third micro-instruction μop3, and the fourth micro-instruction μop4 enter the reservation station 400, they are firstly stored in the temporary register 411. Assuming that each micro-instruction has three source operands Src1~Src3, the number of source operands is not limited thereto and can be adjusted according to the practice implementation. The source operands Src1~Src3 in the FIG. 4 are used to indicate data dependencies, and the message Src4 is used in program order/dependency control, for example, structural dependency.

All dependencies are represented by the index of the reservation-station matrix 420 of the associated instruction. The reservation station 400 in FIG. 4 further includes a reservation-station matrix 420, which is equivalent to the reservation station queue 122 of FIG. 1. The reservation-station matrix 420 includes a plurality of entries R0 to R63. Each of the entries corresponds to storing a micro-instruction to be dispatched and its dependency information. The dependency information includes a dependency domain DD, an age domain AD, and a port domain PD: the value of the dependency domain DD is the same as the depth of the reservation-station matrix 420. For example, the depth of the reservation-station matrix 420 can accommodate 64 micro-instructions: That is, 64 entries R0 to R63. Thus, the value of the dependency domain DD is a 64-bit indicator value dependency [63:0]. If a bit of the indicator value is set (e.g., set to 1), it means that this micro-instruction depends on that micro-instruction stored in the entry corresponding to the location of the bit. For example, if the bit [19] of the indicator value dependency [63:0] stored in the dependency domain DD of the micro-instruction stored in the entry R62 is 1, it means that the micro-instruction stored in the entry R62 depends on the micro-instruction stored in the entry R19. The aged domain AD is similar to the dependency domain DD and is also an indicator value that is the same as the depth of the reservation-station matrix 420. The port domain PD represents via which one of the dispatch ports 1 to 9 the dispatch port designator 410 assigns the micro-instruction to the execution units 1 to 9 for execution.

Next, how the reservation station 400 indicates the aforementioned structural dependency is described in detail in following embodiment. For example, if the instruction type of the third micro-instruction μop3 is floating point micro-instruction (assigned to be executed by execution unit 8), the reservation station 400 queries the scoreboard 412 when processing the third micro-instruction μop3. If the reservation station 400 finds that the scoreboard 412 includes a first micro-instruction μop1 that is a floating point micro-instruction and was recorded earlier on the scoreboard 412, the first dependency indicator value Src4 dependency [63:0] representing the structural dependency of the third micro-instruction μop3 is updated according to the index value of the reservation-station matrix 420 of the first micro-instruction μop1. For example, if the first micro-instruction op is stored earlier in the entry R19 of the reservation-station matrix 420, the bit [19] of the 64 bits included in the first dependency indicator value Src4 dependency [63:0] of the third micro-instruction μop3 is set (for example, set to 1). In addition, the micro-instructions assigned to the execution unit 9 also establish structural dependencies in the same manner.

The following describes how to indicate the data dependency. The comparators 414, 415 and 416 in FIG. 4 are used to indicate the data dependency of the source operands Src1 to Src3, respectively. For source operands Src1 to Src3, data dependencies are established in the same way. A source operand Src1 of a micro-instruction is obtained from the temporary register 411. The source operand Src1 has been renamed to a physical register file (PRF) index by the rename module 106 earlier. In one embodiment, the temporary register 411 can apply a reorder buffer index (ROB index) for renaming. However, those of ordinary skill in the art should be able to understand that no matter which method is used for renaming, it can be apply in this patent. In addition, the destination operands of all micro-instructions already stored in the reservation-station matrix 420 have also been renamed to physical register file indexes.

The reservation station 400 sends the source operands Src1 to Src3 to the comparators 414 to 416, respectively. The reservation station 400 compares the source operands Src1 to Src3 with the destination operand DT of all previous micro-instructions already stored in the reservation-station matrix 420. If some of them are the same, the reservation station 400 sets the value of the corresponding position of the second dependency indicator value Src1 dependency [63:0] (for example, sets to 1). For example, if the source operand Src1 of the second micro-instruction μop2 is the same as the PRF index (or ROB index) of the destination operand of the micro-instruction stored in the entry R21, the reservation station 400 sets the bit [21] of the second dependency indicator value Src1 dependency [63:0] of the second micro-instruction μop2 to 1 to indicate that the source operand Src1 of the second micro-instruction μop2 depends on the micro-instruction stored in entry R21. Comparators 415 and 416 operate similarly to comparator 414 for respectively setting a third dependency indicator value Src2 dependency [63:0] to indicate the data dependency of source operand Src2 of second micro-instruction μop2 and the fourth dependency indicator value Src3 dependency [63:0] to indicate the data dependency of the source operand Src3 of the second micro-instruction μop2. The details are not described herein again.

The reservation station 400 performs an operation of "OR" on all dependency indicator values Src1 dependency [63:0] to Src4 dependency [63:0] (i.e., input to the OR logic gate 418) to obtain the dependency indicator value dependency [63:0] representing all the dependency relations of the third micro-instruction μop3. This dependency indicator value dependency [63:0] is recorded in the dependency domain DD of the entry stored in the third micro-instruction μop3 in the reservation-station matrix 420.

The following describes how to perform the dependency clearance using the value dependency [63:0] in the dependency domain DD.

The reservation-station matrix 420 has a plurality of dispatch ports, for example, dispatch port 8 (port 8) and dispatch port 9 (port 9), for dispatching micro-instructions to the corresponding execution units 1 to 9. For dispatch port 8 (port 8), the reservation station 400 selects the micro-instruction whose dependency has been resolved (That is, the selected micro-instruction is ready for execution), and who is the oldest in the program order (the age of the micro-instructions can be known by age domain AD). The reservation station 400 dispatches the selected micro-instructions to the execution unit 8 for execution (assuming that the dispatch port 8 corresponds to the execution unit 8).

Regard to clearance the dependency, if the second micro-instruction μop2 depends on the first micro-instruction μop1, the dependency of the second micro-instruction μop2 may be resolved after the execution of the first micro-instruction μop1. Moreover, the dependency of the second micro-instruction μop2 may also be resolved when the first micro-instruction μop1 writes back after execution (when the first micro-instruction μop1 writes back, 0 will be sent to the AND logic gate 419, indicating the end of execution). This depends on the execution time of the first micro-instruction μop1 (that is, related to the instruction type of the first micro-instruction μop1). In one embodiment, after the dependency of the second micro-instruction μop2 is resolved and it is executed, the result of the first micro-instruction μop1 just (the most time-intensive case) can be obtained or the first micro-instruction μop1 just vacates the resources of used execution unit before the execution unit performs the calculation. Specifically, after the first micro-instruction μop1 is completely executed, the position corresponding to the first micro-instruction μop1 in the value dependency[63:0] in the dependency domain DD of the second micro-instruction μop2 is cleared. The position corresponding to the first micro-instruction μop1 in the dependency[63:0] is determined by the index value of the first micro-instruction μop1 in the reservation-station matrix 420. For example, the first micro-instruction μop1 is stored earlier in the entry R19 of the reservation-station matrix 420. After the first micro-instruction μop1 is completely executed, the bit[19] of the dependency[63:0] of the second micro-instruction μop2 is cleared (for example, set to 0). When the reservation station 400 determines that all the positions of the dependency[63:0] of the second micro-instruction μop2 are cleared, which means that all the micro-instructions the second micro-instruction μop2 depends on have been executed, i.e., all the dependencies of the second micro-instruction μop2 are released, it is further determined whether the second micro-instruction μop2 is the oldest of all the micro-instructions assigned to be executed by the assigned execution unit (for example, execution unit 8) according to the value of the age domain AD and the value of the port domain PD corresponding to the second micro-instruction μop2. When the second micro-instruction μop2 is the oldest of all the micro-instructions assigned to be executed by the assigned execution unit 8, the second micro-instruction μop2 is dispatched by the reservation station 400 to the assigned execution unit 8 for execution.

Figure 5:
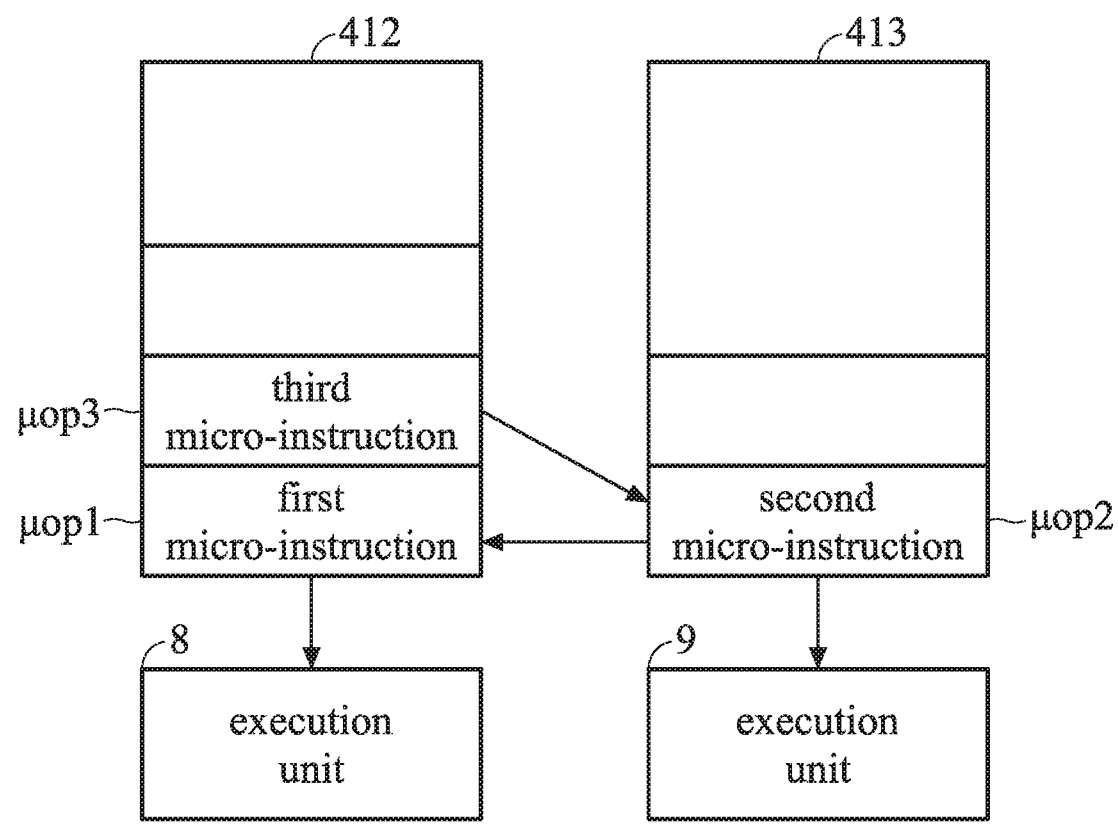
FIG. 5 is a schematic diagram illustrating an instruction execution method according to an embodiment of the invention.

FIG. 5 is a schematic diagram illustrating an instruction execution method according to an embodiment of the invention. In one embodiment, if the third micro-instruction μop3 structurally depends on the first micro-instruction μop1, and it is assumed that the first micro-instruction μop1, the second micro-instruction μop2, the third micro-instruction μop3 have the same instruction type (for example, floating point operation micro-instructions), and the processor provides two execution units 8 and 9 of the same type (for example, both floating-point operation execution units) to execute the three micro-instructions, then, the dispatch port designator 410 can dispatch the three micro-instructions in a round robin manner: dispatching the first micro-instruction μop1 and the third micro-instruction μop3 from the dispatch port 8 to the execution unit 8 for execution, and dispatching the second micro-instruction μop2 to the execution unit 9 for execution. The scoreboard 412 of the dispatch port 8 records the messages of the first micro-instruction μop1 and the third micro-instruction μop3 in order. Moreover, the scoreboard 413 of the dispatch port 9 records the message of the second micro-instruction μop2. Thereby, the first micro-instruction μop1 and the third micro-instruction μop3 have structural dependency because they need to occupy the same hardware execution resource (such as the execution unit 8) for execution. The second micro-instruction μop2 has the same instruction type as the first micro-instruction μop1 and the third micro-instruction μop3, but the hardware execution resources (such as the execution unit 9) to be occupied by the second micro-instruction μop2 is different from the first micro-instruction μop1 and the third micro-instruction μop3. Therefore, the second micro-instruction μop2 has no structural dependency with the first micro-instruction μop1 and the third micro-instruction μop3.

In summary, the instruction execution method and the instruction execution device of the present invention that the reservation station indicates a structural dependency with the proceeding micro-instruction for the succeeding micro-instruction, so that the succeeding micro-instruction can wait for the execution of the proceeding micro-instruction. After the execution of the proceeding micro-instruction is complete, the succeeding micro-instruction is dispatched by the reservation station for execution. In the occasion to execute multiple micro-instructions with structural dependency and instruction types needing a long operation time, delays caused by the succeeding micro-instruction that is executed before the proceeding micro-instruction but that can only be retired after waiting for proceeding micro-instructions and other proceeding instructions to retire in order are avoided. The instruction execution method and the instruction execution device of the present invention greatly reduces overall execution time.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An instruction execution method, suitable for being executed by a processor, wherein a first processor comprises a register alias table (RAT) and a reservation station, and the instruction execution method comprises:

receiving a first micro-instruction and a second micro-instruction by the register alias table, and issuing the first micro-instruction and the second micro-instruction to the reservation station by the register alias table, wherein the first micro-instruction is a preceding micro-instruction of the second micro-instruction; and assigning by the reservation station one of a plurality of execution units to execute the first micro-instruction, according to a first specific message of the first micro-instruction; and assigning by the reservation station one of the execution units to execute the second micro-instruction, according to a second specific message of the second micro-instruction;

wherein when the reservation station determines that the execution units assigned for the first micro-instruction and the second micro-instruction are the same, the reservation station indicates that the second micro-instruction depends on the first micro-instruction;

wherein when the reservation station assigns the first micro-instruction to be dispatched by a first dispatch port of the reservation station for execution, the reservation station records a message corresponding to the first micro-instruction on a first scoreboard corresponding to the first dispatch port;

wherein, when the reservation station assigns the second micro-instruction to be dispatched by the first dispatch port for execution, and the reservation station finds that the first scoreboard includes a message corresponding to the first micro-instruction, the reservation station indicates the second micro-instruction depends on the first micro-instruction;

wherein, when the reservation station assigns the second micro-instruction to be dispatched by a second dispatch port of the reservation station for execution, the reservation station records another message corresponding to the second micro-instruction on a second scoreboard corresponding to the second dispatch port.

2. The instruction execution method of claim 1, wherein the first specific message and the second specific message represent instruction types of the first micro-instruction and the second micro-instruction respectively.

3. The instruction execution method of claim 2, wherein when the instruction types of the first micro-instruction and the second micro-instruction are the same, the reservation station assigns the same execution unit as the first micro-instruction for the second micro-instruction.

4. The instruction execution method of claim 2, wherein when the instruction types of the first micro-instruction and the second micro-instruction are the same, the reservation station assigns one of the execution units for the first micro-instruction and the second micro-instruction in a round robin manner.

5. The instruction execution method of claim 1, wherein the reservation station determines whether the execution units assigned by the reservation station for the first micro-instruction and the second micro-instruction are the same according to whether a dispatch port corresponding to the execution unit assigned by the reservation station for the second micro-instruction includes a message corresponding to the first micro-instruction.

6. The instruction execution method of claim 1, wherein the step in which the reservation station indicates that the second micro-instruction depends on the first micro-instruction further comprises:

updating, by the reservation station, a first dependency indicator value corresponding to the second micro-instruction according to a reservation-station matrix-index value of the first micro-instruction.

7. The instruction execution method of claim 1, wherein the step in which the reservation station indicates that the second micro-instruction depends on the first micro-instruction further comprises:

updating, by the reservation station, at least one second dependency indicator value corresponding to the second micro-instruction according to at least one source operand of the second micro-instruction; and performing, by the reservation station, an OR operation on the first dependency indicator value and the second dependency indicator value to obtain a dependency region value corresponding to the second micro-instruction.

8. The instruction execution method of claim 1, further comprising:

after the first micro-instruction is executed, the position corresponding to the first micro-instruction in a dependency region value corresponding to the second micro-instruction is cleared;

when the reservation station determines that all the positions of the dependency region value corresponding to the second micro-instruction are cleared, determining whether the second micro-instruction is the oldest of all micro-instructions assigned to be executed by the assigned execution unit according to the value of an age domain and the value of a port domain corresponding to the second micro-instruction;

when the second micro-instruction is the oldest of all micro-instructions assigned to be executed by the assigned execution unit, the second micro-instruction is dispatched by the reservation station to the assigned execution unit to execute.

9. The instruction execution method of claim 8, wherein the position corresponding to the first micro-instruction in the dependency region value corresponding to the second micro-instruction is determined by the reservation-station matrix-index value of the first micro-instruction.

10. The instruction execution method of claim 1, wherein the reservation station further comprises a reservation-station matrix, the reservation-station matrix comprises a plurality of entries, and each entry comprises a dependency domain, an age domain, and a port domain corresponding to a micro-instruction.

11. An instruction execution device, comprising:

a reservation station; and a register alias table, configured to receive a first micro-instruction and a second micro-instruction, and to issue the first micro-instruction and the second micro-instruction to the reservation station, wherein the first micro-instruction is a preceding micro-instruction of the second micro-instruction;

wherein the reservation station assigns one of the execution units to execute the first micro-instruction according to a first specific message of the first micro-instruction, and assigns one of the execution units to execute the second micro-instruction according to a second specific message of the second micro-instruction;

wherein when the reservation station determines that the execution units assigned for the first micro-instruction and the second micro-instruction are the same, the reservation station indicates that the second micro-instruction depends on the first micro-instruction;

wherein when the reservation station assigns the first micro-instruction to be dispatched by the first dispatch port of the reservation station for execution, the reservation station records a message corresponding to the first micro-instruction on the first scoreboard corresponding to the first dispatch port;

wherein, when the reservation station assigns the second micro-instruction to be dispatched by the first dispatch port for execution, and the reservation station finds that the first scoreboard includes a message corresponding to the first micro-instruction, the reservation station indicates the second micro-instruction depends on the first micro-instruction;

wherein, when the reservation station assigns the second micro-instruction to be dispatched by the second dispatch port of the reservation station for execution, the reservation station records another message corresponding to the second micro-instruction on a second scoreboard corresponding to the second dispatch port.

12. The instruction execution device of claim 11, wherein the first specific message and the second specific message represent the instruction types of the first micro-instruction and the second micro-instruction respectively.

13. The instruction execution device of claim 12, wherein when the instruction types of the first micro-instruction and the second micro-instruction are the same, the reservation station assigns the same execution unit as the first micro-instruction for the second micro-instruction.

14. The instruction execution device of claim 12, wherein when the instruction types of the first micro-instruction and the second micro-instruction are the same, the reservation station assigns one of the execution units for the first micro-instruction and the second micro-instruction in a round robin manner.

15. The instruction execution device of claim 11, wherein the reservation station determines whether the execution units assigned by the reservation station for the first micro-instruction and the second micro-instruction are the same according to whether a dispatch port corresponding to the execution unit assigned by the reservation station for the second micro-instruction includes a message corresponding to the first micro-instruction.

16. The instruction execution device of claim 11, wherein the reservation station updates a first dependency indicator value corresponding to the second micro-instruction according to a reservation-station matrix-index value of the first micro-instruction.

17. The instruction execution device of claim 11, wherein the reservation station updates at least one second dependency indicator value corresponding to the second micro-instruction according to the at least one source operand of the second micro-instruction; and the reservation station performs an OR operation on the first dependency indicator value and the second dependency indicator value to obtain a value of a dependency region corresponding to the second micro-instruction.

18. The instruction execution device of claim 11, wherein after the first micro-instruction is executed, the reservation station cleans the position corresponding to the first micro-instruction in a dependency region value corresponding to the second micro-instruction;
when the reservation station determines that all the positions of the dependency region value corresponding to the second micro-instruction are cleared, the reservation station determines whether the second micro-instruction is the oldest of all micro-instructions assigned to be executed by the assigned execution unit according to the value of the age domain and the value of the port domain corresponding to the second micro-instruction;
when the second micro-instruction is the oldest of all micro-instructions assigned to be executed by the assigned execution unit, the second micro-instruction is dispatched by the reservation station to the assigned execution unit to execute.

19. The instruction execution method of claim 1, wherein the first micro-instruction and the second micro-instruction are floating point operation instructions.

\* \* \* \* \*